United States Patent
Erger (10) Patent No.: US 9,118,183 B2
(45) Date of Patent: Aug. 25, 2015

(54) AUTO DETECTION OF VEHICLE TYPE CONNECTED TO AN EVSE

(75) Inventor: Robert Erger, Swisher, IA (US)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 429 days.

(21) Appl. No.: 13/490,758

(22) Filed: Jun. 7, 2012

(65) Prior Publication Data

US 2013/0328525 A1   Dec. 12, 2013

(51) Int. Cl.
| | |
|---|---|
| *H02J 7/00* | (2006.01) |
| *B60L 1/00* | (2006.01) |
| *H02J 7/04* | (2006.01) |

(52) U.S. Cl.
CPC ... *H02J 7/00* (2013.01); *B60L 1/00* (2013.01); *H02J 7/0027* (2013.01); *H02J 7/045* (2013.01); *H02J 2007/0096* (2013.01); *Y02T 90/128* (2013.01); *Y02T 90/168* (2013.01); *Y02T 90/169* (2013.01); *Y04S 30/12* (2013.01); *Y04S 30/14* (2013.01)

(58) Field of Classification Search
CPC ....... Y02T 90/12; Y02T 90/128; Y02T 90/14; H02J 7/0027; H02J 7/045; H02J 2007/0096; Y02E 60/12
USPC .......... 320/107, 109, 137, 148, 149, 152, 162
See application file for complete search history.

(56) References Cited

U.S. PATENT DOCUMENTS

| | | | |
|---|---|---|---|
| 5,583,418 A | 12/1996 | Honda et al. | |
| 6,031,353 A * | 2/2000 | Banyas et al. | 320/112 |
| 8,019,483 B2 | 9/2011 | Keefe | |
| 8,266,075 B2 * | 9/2012 | Ambrosio et al. | 705/412 |
| 8,823,330 B2 * | 9/2014 | Ree et al. | 320/162 |
| 8,854,013 B2 * | 10/2014 | Gao et al. | 320/155 |
| 2008/0238361 A1 * | 10/2008 | Pinnell et al. | 320/107 |
| 2009/0318774 A1 | 12/2009 | Ichikawa et al. | |
| 2010/0134067 A1 | 6/2010 | Baxter et al. | |
| 2010/0145717 A1 | 6/2010 | Hoeltzel | |
| 2010/0211643 A1 | 8/2010 | Lowenthal et al. | |
| 2010/0315197 A1 | 12/2010 | Solomon et al. | |
| 2011/0025267 A1 | 2/2011 | Kamen et al. | |
| 2011/0156641 A1 * | 6/2011 | Kishiyama et al. | 320/109 |
| 2011/0175569 A1 * | 7/2011 | Austin | 320/109 |
| 2011/0193522 A1 * | 8/2011 | Uesugi | 320/109 |
| 2011/0204847 A1 | 8/2011 | Turner | |
| 2011/0213656 A1 | 9/2011 | Turner | |
| 2011/0254504 A1 * | 10/2011 | Haddad et al. | 320/109 |
| 2011/0282527 A1 * | 11/2011 | Inbarajan et al. | 701/22 |
| 2011/0298422 A1 * | 12/2011 | Failing | 320/109 |

(Continued)

*Primary Examiner* — Stacy Whitmore
(74) *Attorney, Agent, or Firm* — Locke Lord LLP (57) ABSTRACT

Apparatus and methods for discerning information about a vehicle (e.g., an electric vehicle's make, model, and/or year of manufacturer) being charged by an electric vehicle supply equipment ("EVSE"). Vehicle make, model, and model year can be discerned by measuring charging current supplied to the electric vehicle over time and comparing this profile to stored profiles of known electric vehicles. Vehicle information can also be discerned by monitoring a pilot signal sent to the electric vehicle by the EVSE. When the EVSE is ready to charge the electric vehicle, the pilot signal sends a charge-ready indication. When the electric vehicle is ready to be charged, it sends an acknowledgement. The time between the EVSE indicating it is ready to charge and the electric vehicle acknowledging that it is ready to be charged is measurable and can used to identify an electric vehicle make, model, and model year.

16 Claims, 5 Drawing Sheets

(56) References Cited

U.S. PATENT DOCUMENTS

| | | | |
|---|---|---|---|
| 2012/0005031 A1* | 1/2012 | Jammer | 705/16 |
| 2012/0049793 A1* | 3/2012 | Ross et al. | 320/109 |
| 2012/0109409 A1* | 5/2012 | Hara | 701/1 |
| 2012/0139489 A1* | 6/2012 | Gaul et al. | 320/109 |
| 2012/0169271 A1* | 7/2012 | Dvorkin et al. | 320/106 |
| 2012/0280653 A1* | 11/2012 | Prosser et al. | 320/109 |
| 2012/0286723 A1* | 11/2012 | Ukita et al. | 320/107 |
| 2012/0293123 A1* | 11/2012 | Akai et al. | 320/109 |
| 2013/0002188 A1* | 1/2013 | Uyeki | 320/101 |
| 2013/0038283 A1* | 2/2013 | Acena et al. | 320/109 |
| 2013/0041531 A1* | 2/2013 | LaFrance | 701/22 |
| 2013/0041850 A1* | 2/2013 | LaFrance | 705/412 |
| 2013/0093384 A1* | 4/2013 | Nyu et al. | 320/107 |
| 2013/0099739 A1* | 4/2013 | Takashima et al. | 320/109 |
| 2013/0099740 A1* | 4/2013 | Takashima et al. | 320/109 |
| 2013/0099742 A1* | 4/2013 | Takashima et al. | 320/109 |
| 2013/0116868 A1* | 5/2013 | Erko et al. | 701/22 |
| 2013/0134940 A1* | 5/2013 | Tominaga | 320/109 |
| 2013/0175988 A1* | 7/2013 | Ghabbour et al. | 320/109 |
| 2013/0176002 A1* | 7/2013 | Ghabbour et al. | 320/163 |
| 2013/0179061 A1* | 7/2013 | Gadh et al. | 701/123 |
| 2013/0179383 A1* | 7/2013 | Pringle et al. | 706/46 |
| 2013/0193918 A1* | 8/2013 | Sarkar et al. | 320/109 |
| 2013/0278225 A1* | 10/2013 | Dietze et al. | 320/137 |
| 2013/0300362 A1* | 11/2013 | Turner | 320/109 |
| 2014/0159659 A1* | 6/2014 | Nosaka | 320/109 |

* cited by examiner

AUTO DETECTION OF VEHICLE TYPE CONNECTED TO AN EVSE

FIELD OF THE INVENTION

The invention relates electric vehicles, and more particularly to electric vehicle supply equipment ("EVSE").

BACKGROUND OF THE INVENTION

As electric vehicles become more popular and more prevalent, infrastructure is being developed and deployed to charge such electric vehicles. Electric vehicle supply equipment ("EVSE") can include electric vehicle charging stations used by vehicle owners (e.g., in an owner's garage), charging stations deployed by retailers (e.g., at gas stations and drug stores), and more sophisticated charging stations used by automobile service stations and dealers.

The Society of Automotive Engineers ("SAE") has promulgated recommendations specifying the electrical characteristics and protocols to promote uniformity in EVSE and encourage wider deployment. For example the recommendation SAE J1772, specifies that Level 1 alternating current ("AC") EVSE support electric vehicle charging at 120 VAC and up to 16 A. Such devices include charging stations in a vehicle owner's garage. A Level 2 AC EVSE supports charging at 240 VAC and up to 80 A. Such a device provides faster charging compared to a Level 1 AC EVSE, and is more common at a retail establishment.

Level 1 and Level 2 chargers also include support for a pilot signal. A pilot signal is a low voltage signal transmitted by the EVSE to the electric vehicle indicating when the EVSE is ready to supply charging power. The pilot signal is acknowledged by the electric vehicle, indicating that the vehicle is ready to receive power. The pilot signal can be carried on a conductor that is included in the cable and plug that also carries the charging power to the vehicle. A separate pin in the plug can be allocated to the pilot signal.

Level 3 AC chargers are faster and more sophisticated than Level 2 chargers. Such devices can charge a vehicle quickly, e.g., on the order of ten to thirty minutes. Level 3 EVSE is most common at dealers and automotive service stations. In addition to being faster, a Level 3 charger can also include a serial data connection between the EVSE and the electric vehicle. Using the serial data connection, an electric vehicle can communicate to the EVSE information about the vehicle, such as the vehicle's make and model. However, the serial connection requires additional hardware and cables. It would be advantageous to extract vehicle information without the added complexity and expense of this additional equipment.

SUMMARY OF THE INVENTION

The present disclosure provides mechanisms for discerning information about a vehicle (e.g., an electric vehicle's make, model, and/or year of manufacturer) being charged by an EVSE. In one embodiment, vehicle information can be discerned by measuring a charge current supplied to the electric vehicle over time and comparing a profile of the measured current to stored profiles of known electric vehicles. For example, as it begins charging, a Chevrolet Volt® will draw current in an amount that increases over time in a profile unique to that make and model. The current drawn by a Nissan LEAF[trade] will ramp up differently. Each make, model, and year may have its own "signature." By measuring that signature and comparing it to known signatures, the particular make, model, and model year of the particular electric vehicle being charged can be determined.

In another embodiment, vehicle information can be discerned by monitoring the pilot signal sent to the electric vehicle by the EVSE. The EVSE sends a low-voltage pilot signal to the electric vehicle. When the EVSE is ready to charge the electric vehicle, the pilot signal sends a charge-ready indication (e.g., an oscillating square wave of a first maximum positive voltage). When the electric vehicle is ready to be charged, it sends an acknowledgement (e.g., engaging a resistor to reduce the maximum positive pilot voltage drawn from the EVSE). The time between the EVSE indicating it is ready to charge and the electric vehicle acknowledging that it is ready to be charged is measurable and can be unique to each electric vehicle make, model, and model year. By measuring and characterizing the interaction between the EVSE and the electric vehicle over the pilot signal, and comparing its profile to known profiles, the particular make, model, and model year of the particular electric vehicle being charged can be determined.

Little additional hardware and no additional physical connections are necessary to extract this vehicle information. Instead, the information is collected through the power and pilot connections supplied to electric vehicles in existing Level 1 and 2 EVSE. The information gathered about the electric vehicle can be used by the EVSE owner or manufacturer to present customized advertisements to the vehicle owner or driver.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Figure 1:
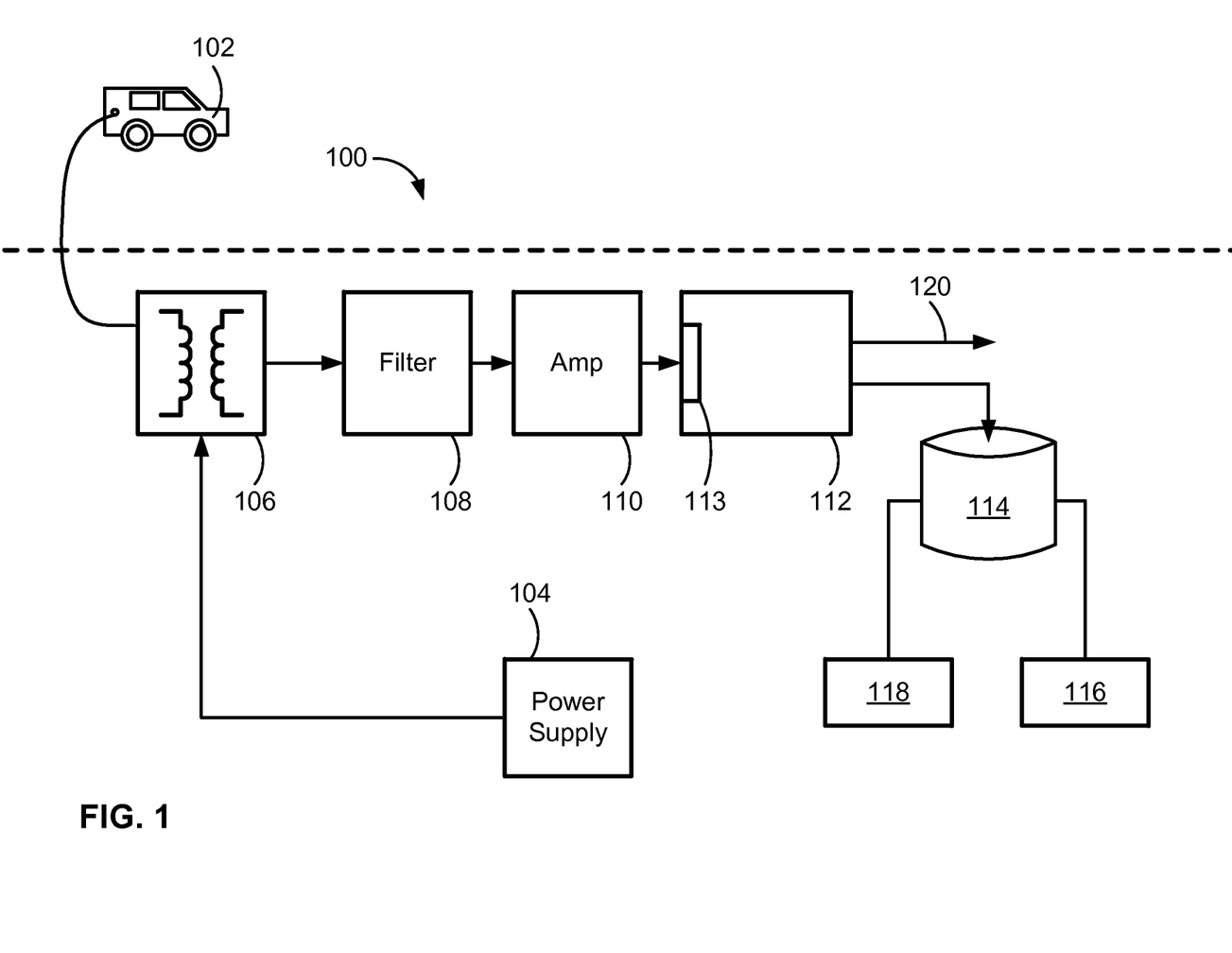
FIG. 1 is a block diagram of an EVSE in accordance with an aspect of the disclosure.

FIG. 1 depicts a block diagram of an EVSE 100 for charging the battery of an electric vehicle 102. The EVSE 100 can be an electric vehicle charging station, and can be, for example, a Level 1 or Level 2 EVSE. The electric vehicle 102 can be any vehicle that operates in whole or in part through power supplied by a battery. For example, the electric vehicle can be an all-electric vehicle such as a Nissan LEAF[trade].

The electric vehicle 102 could also be a hybrid gas-electric vehicle that is configured to connect to an EVSE for charging of the vehicle's battery, such as a Chevrolet Volt®.

The EVSE 100 includes a power supply 104 for supplying charging power to a battery of the electric vehicle 102. The power supply 104 can be, for example, a 120 VAC power supply capable of providing current up to 16 A, consistent with a Level 1 AC EVSE as provided in SAE J1772. For example, the EVSE 100 can be a charging station directed to residential use at the home or garage of the electric vehicle's owner. Such a charging station is more economical; however because of the limits on the power it can supply, it recharges vehicle batteries more slowly. It ordinarily is sufficient for charging an electric vehicle overnight.

The power supply 104 can also be a 240 VAC power supply capable of supplying up to 80 A, consistent with a Level 2 AC EVSE. For example, the EVSE 100 can be a charging station at a retail establishment, such as a gas station, drug store, or grocery store. Because of its higher power output, such an EVSE can charge a vehicle's battery more quickly, and thus permits the vehicle to be recharged while the driver shops or conducts other activities.

The power supply 104 could also be a Level 3 AC EVSE. It could also be an EVSE consistent with recommendations promulgated by other sources besides the SAE, or it could be a direct current ("DC") power supply consistent with similar recommendations promulgated by the SAE or other sources.

With further reference to FIG. 1, the EVSE 100 also includes a current measurement device 106, such as a transformer for monitoring the power supplied by the power supply 104 to the battery of the electric vehicle 102. For example, the transformer 106 can be a current transformer with a first winding coupling the power supply 104 to the electric vehicle 102. The second winding of the transformer 106 can be monitored to determine the current supplied to the electric vehicle at a given instance of time. The current of the second winding of the transformer 106 can be filtered by a filter 108 and the filtered signal amplified by an amplifier 110. Alternatively, the current measurement device 106 could be a shunt resistor or a hall effect sensor.

The filtered and amplified signal can be received by a comparator 112. The comparator 112 includes a central processing unit (CPU), controller, or processor, and an interface system 113. The comparator 112 is coupled to a memory 114, which can be integrated with the CPU or a separate component. The comparator 112, the interface system 113, and the memory 114 can be coupled together by a bus or other link, although other numbers and types of each of the components and other configurations and locations for the components can be used. The interface system 113 can include analog-to-digital (ADC) interfaces, for example ADC interfaces typically integrated with the CPU. The filter 108 and the amplifier 110 condition the signal from the transformer 106 to be an appropriate frequency and voltage range for acceptance at an ADC interface of the CPU. The comparator 112 can execute a program of stored instructions for one or more aspects of the methods and systems as described herein, including for identification of electric vehicles, although the controller can execute other types of programmed instructions. The memory 114 can store these programmed instructions for one or more aspects of the methods and systems as described herein, including the methods for identification of electric vehicles, although some or all of the programmed instructions can be stored and/or executed elsewhere. A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, can be used for the memory 114.

As the electric vehicle 102 begins charging, the electric current that it draws from the power supply 104 ramps up over time. The comparator 112 tracks the changes in current as the current ramps up over a predetermined period of time (e.g., ten seconds) starting when charging initiates. The tracking could, for example, start when the electric vehicle acknowledges a pilot signal from the EVSE 100 indicating that the EVSE is ready to supply power. The comparator 112 records the current ramp for the electric vehicle 102 in a profile 116. The profile 116 can be stored in the memory 114 or in a memory resident in the CPU of the comparator 112.

Figure 2:
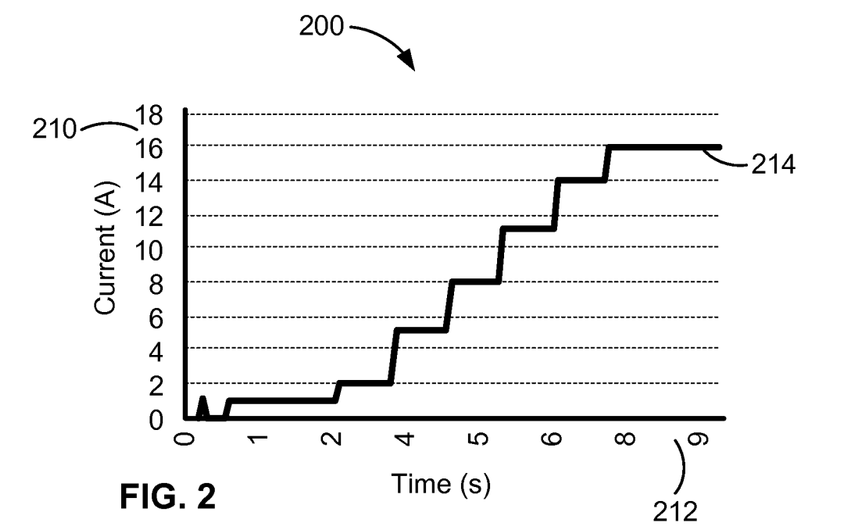
FIG. 2 is a graph of a current ramp profile for an electric vehicle in accordance with an aspect of the disclosure.

The memory 114 also includes a plurality of stored current ramp profiles 118. The stored profiles 118 are associated with known electric vehicles. A stored profile can be created by measuring the current ramp of an electric vehicle of a particular make, model, and/or year in a controlled setting, storing the profile in a file or record, and associating that file or record with the particular make, model, and/or model year. FIG. 2 illustrates a graph of a stored current ramp profile 200 for a particular electric vehicle (e.g., a Nissan LEAF[trade]—note that FIG. 2 is for illustrative purposes only, and may not represent the profile of an actual Nissan LEAF[trade]). The vertical axis 210 indicates electric current drawn by the electric vehicle (e.g., from 0 to 18 A) and the horizontal axis 212 indicates the time at which the current was measured (e.g., from 0 to 10 seconds from initiation). A graph line 214 shows how the current drawn changes over the ten-second measurement period, generally ramping upwards.

Figure 3:
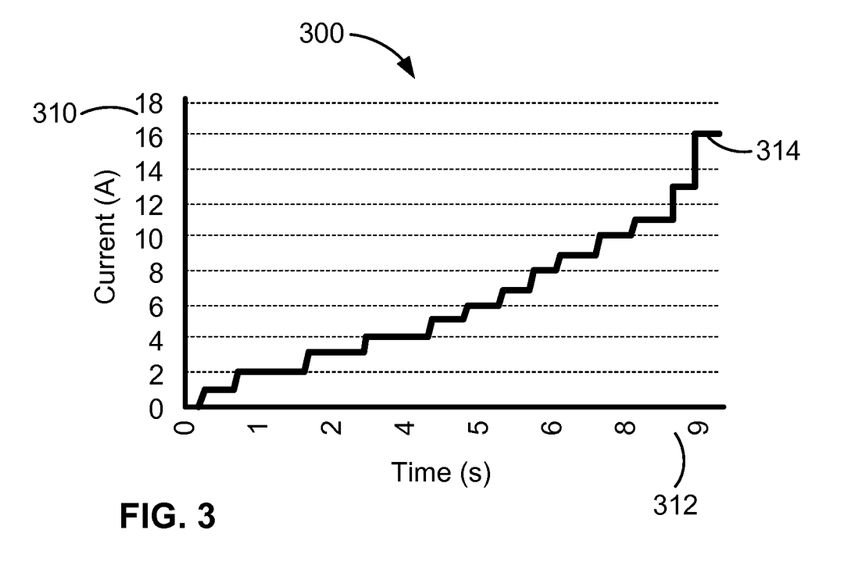
FIG. 3 is a graph of a current ramp profile for a different electric vehicle than FIG. 2.

FIG. 3 illustrates a graph of a second stored current ramp profile 300 for a different electric vehicle (e.g., a Chevrolet Volt®—note that FIG. 3 is for illustrative purposes only, and may not represent the profile of an actual Chevrolet Volt®). The vertical axis 310 indicates electric current drawn by the electric vehicle (e.g., from 0 to 18 A) and the horizontal axis 312 indicates the time at which the current was measured (e.g., from 0 to 10 seconds from initiation). A graph line 314 shows how the current drawn changes over the ten-second measurement period. As can be seen by comparing the graph line 214 of FIG. 2 to the graph line 314 of FIG. 3, the second electric vehicle of FIG. 3 ramps up its current draw more gradually over a ten-second period than does the first electric vehicle of FIG. 2. The two stored profiles are distinguishable and can be used to uniquely identify the two different vehicles. In essence, each electric vehicle's profile can be considered the unique signature of that vehicle type. The stored profiles may also include averages of several measurements of the same vehicle type or other composites of multiple measurements. This reduces the error that could be introduced by variations within vehicles of a particular make, model, and/or model year.

The comparator 112 compares the profile 116 of the current draw of the electric vehicle 102 to the plurality of stored current profiles 118 in the memory 114. The comparator 112 selects the closest match stored current profile to the electric vehicle 102's measured current profile 116. The comparator then generates a result 120, which includes information indicative of the electric vehicle 102's make, model, and/or model year. For example, if the profile 116 most closely matches the profile of FIG. 2, the result 120 will include an indication that the electric vehicle 102 is a Nissan LEAF [trade]. If the profile 116 most closely matches the profile of FIG. 3, the result 120 will include an indication that the electric vehicle 102 is a Chevrolet Volt®.

Figure 4:
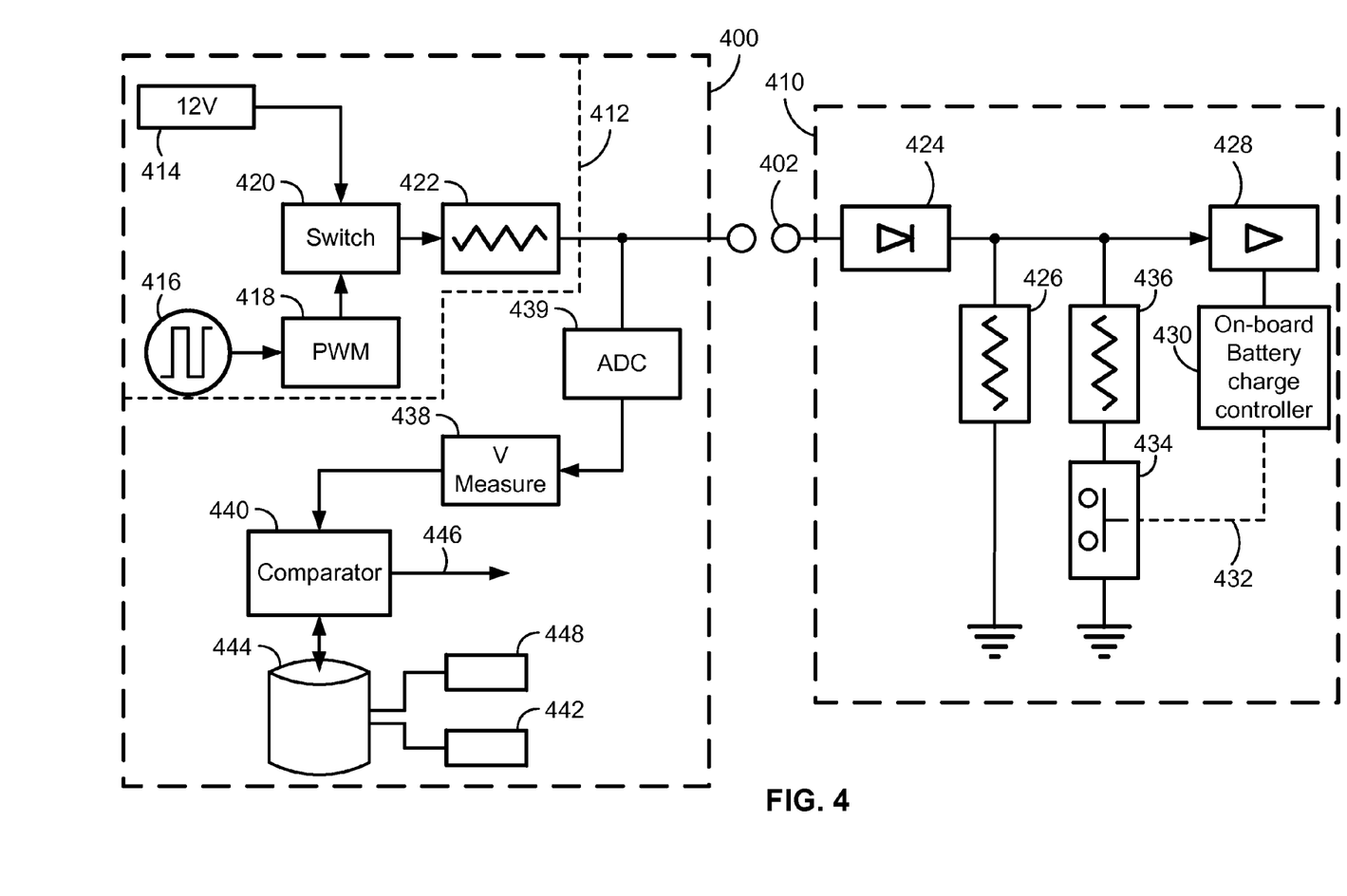
FIG. 4 is a block diagram of an EVSE in accordance with an aspect of the disclosure.

FIG. 4 depicts a block diagram of circuitry for communicating between an EVSE 400 and an electric vehicle 410 through a pilot signal. The EVSE 400 is connected to the electric vehicle through a connection 402, for example a pilot pin on the plug at the end of the cable that is plugged into the electric vehicle 410. The EVSE 400 includes pilot signal generation circuitry 412, which includes a 12 V DC signal generator 414. The signal generation circuitry 412 also includes an oscillator 416 for generating a square wave that oscillates from a maximum positive voltage (e.g., +12V) to a maximum negative voltage (e.g., −12V) and a pulse width modulator ("PWM") 418 that controls the widths of the pulses of the square wave generated by the oscillator 416. For example, the oscillator 416 can generate a signal that oscillates at 1000 Hz. The width of the pulse of the pilot signal communicated to the electric vehicle 410 can indicate characteristics of the EVSE 400. For example, a ten percent pulse width indicates that the EVSE 400 can supply up to 10 A, a 25 percent pulse width indicates that the EVSE 400 can supply up to 16 A, etc.

A switch 420 in the pilot signal generation circuitry 412 switches between the 12 V pilot signal generated by the DC signal generator 414 and the oscillating pilot signal generated by the oscillator 416 and the PWM 418. The pilot signal is supplied through a resistor 422 in the pilot signal generation circuitry 412 and a diode 424 in the electric vehicle 410. The pilot signal is amplified by an amplifier 428 and supplied to a battery controller 430 of the electric vehicle 410. The battery controller 430 can include a CPU.

The EVSE 400 includes a voltage measurement module 438 that is coupled to the connection 402 through an ADC 439. The voltage measurement module 438 measures the voltage output to the connection 402 by the pilot signal generation circuitry 412. The voltage measurement module 438 is coupled to a comparator 440. The comparator 440 can be implemented in whole or in part by the same CPU included with the comparator 112, or can include a separate CPU. The voltage measurement module 438 and the ADC 439 can be implemented as part of the same CPU as the comparator 440. For example the ADC 439 can be an ADC port typically included with the CPU and the voltage measurement module 438 can be implemented as software executed on the same CPU as software for the comparator 440. Alternatively, the ADC 439 and the voltage measurement module 438 can be separate circuitry.

Figure 5:
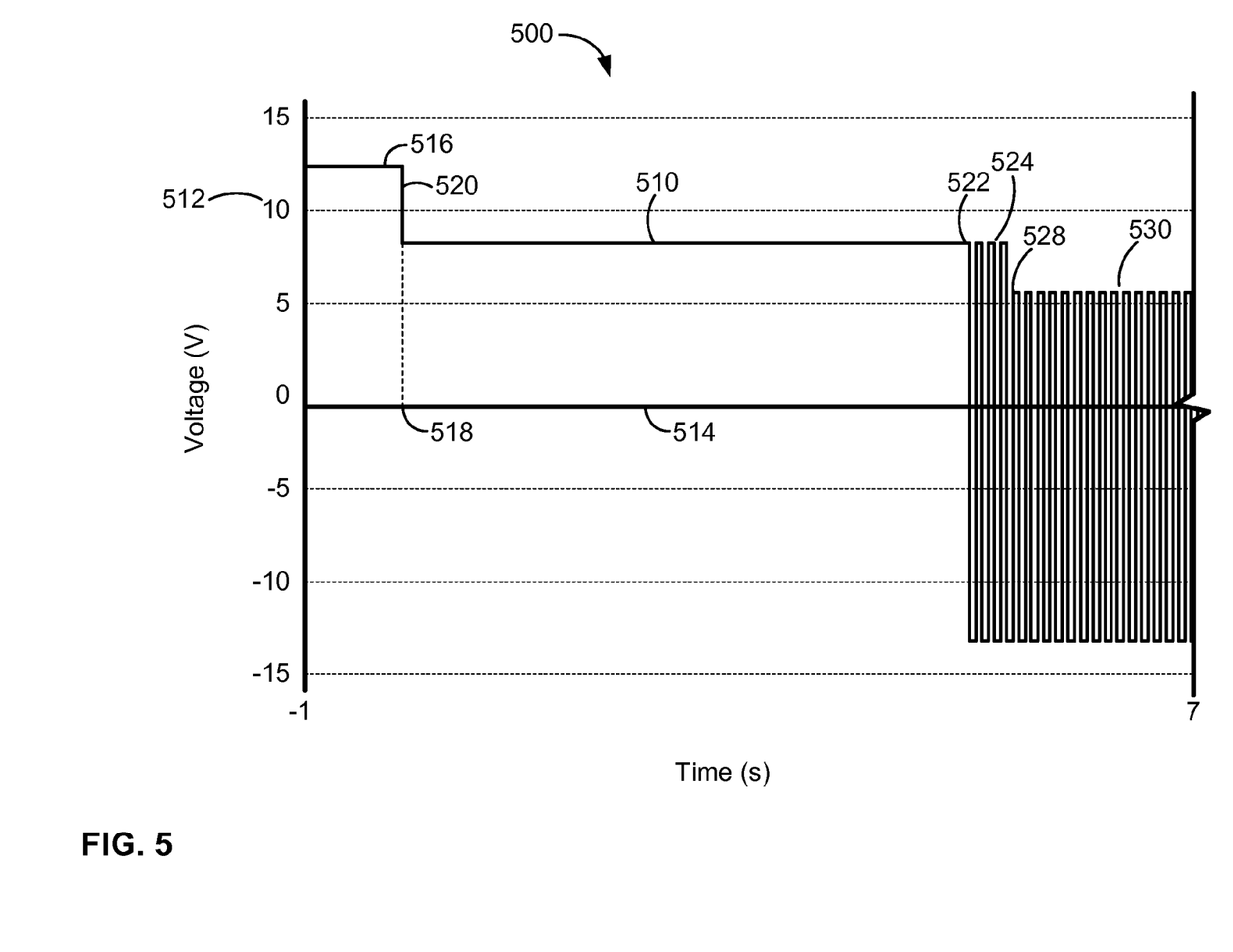
FIG. 5 is a graph of a pilot signal profile for an electric vehicle in accordance with an aspect of the disclosure.

FIG. 5 shows an example graph 500 of a pilot signal 510 measured by the voltage measurement module 438. The vertical axis 512 of the graph 500 indicates a voltage, e.g., from +15 V to −15 V in increments of 5 V. The horizontal axis 514 of the graph 500 indicates a time, e.g., from −1 second to approximately 7 seconds in increments of approximately 0.3 seconds. With reference to FIGS. 4 and 5, before charging, the pilot signal generation circuitry 412 generates the 12 V DC pilot signal. If the electric vehicle 410 is not connected to the EVSE 400, the voltage measurement module 438 measures a DC voltage of 12 V, as shown at portion 516 of the pilot signal 510. At time zero seconds 518, the EVSE 400 is plugged into the electric vehicle 410. The electric vehicle 410 includes a resistor 426, for example a 2,740Ω resistor, that causes the voltage at the connection 402 to drop (e.g., from +12 V to +9V) when the electric vehicle 410 is plugged into the EVSE 400. This is shown at portion 520 of the pilot signal 510.

When the EVSE 400 is ready to begin charging the battery of the electric vehicle 410 (point 522 of the pilot signal 510, corresponding to approximately 5.5 seconds), it causes the switch 420 to engage the oscillator 416 and PWM 418 to generate a square wave. Because of the resistor 426, the square wave oscillates between +9 V and −12 V, as shown at portion 524 of the pilot signal 510. The electric vehicle 410's battery controller 430 receives the oscillating signal and interprets it to mean that the EVSE 400 is ready to supply power to charge the battery. The battery controller 430 acknowledges the charge ready indication by sending a signal 432 to a switch 434 to engage a resistor 436 in parallel with the resistor 426. The parallel resistor 436 further reduces the voltage at the connection 402. For example, the parallel resistor 436 can be 1,300Ω resistor, which reduces the oscillating voltage range at the connection 402 to +6 V to −12 V. The acknowledgement is shown at point 528 of the pilot signal 510, corresponding to approximately 6.0 seconds. After point 528, the voltage measurement module continues to measure a square wave oscillating between +6 V and −12 V, as shown in portion 530 of the pilot signal 510.

The comparator 440 tracks the changes in voltage of the pilot signal 510 over time as the vehicle is plugged in, the EVSE 400 indicates it is ready to charge, and the electric vehicle 410 acknowledges the charge-ready indication. The comparator 440 records the tracked pilot signal measurements in a profile 442. The profile 442 can be stored in a memory 444, which can be a separate memory or a memory resident in the CPU of the comparator 440. If the comparator 440 is implemented using the same CPU as the comparator 112, the memory 444 can be the same memory as the memory 114.

The memory 444 also includes a plurality of stored voltage profiles 448. The stored voltage profiles 448 are associated with known electric vehicles. A stored profile can be created by measuring the pilot signal voltage of an electric vehicle of a particular make, model, and/or model year in a controlled setting, storing the profile in a file or record, and associating that file or record with the particular make, model, and/or model year. As with the current profiles described above, each electric vehicle type's pilot voltage profile can be considered the unique signature of that vehicle type. For example, vehicles of separate makes, models, and/or model years may take unique and distinguishable amounts of times to acknowledge charge-ready signals from an EVSE. The stored voltage profiles may also include averages of several measurements of the same vehicle type or other composites of multiple measurements to reduce error that could be introduced by variations within vehicles of a particular make, model, and/or model year.

The comparator 440 compares the profile 442 of the pilot signal voltage 510 to the plurality of stored voltage profiles 448 in the memory 444. The comparator 440 selects the closest match stored voltage profile to the electric vehicle 410's measured voltage profile 442. The comparator 440 then generates a result 446, which includes information indicative of the electric vehicle 410's make, model, and/or model year.

Figure 6:
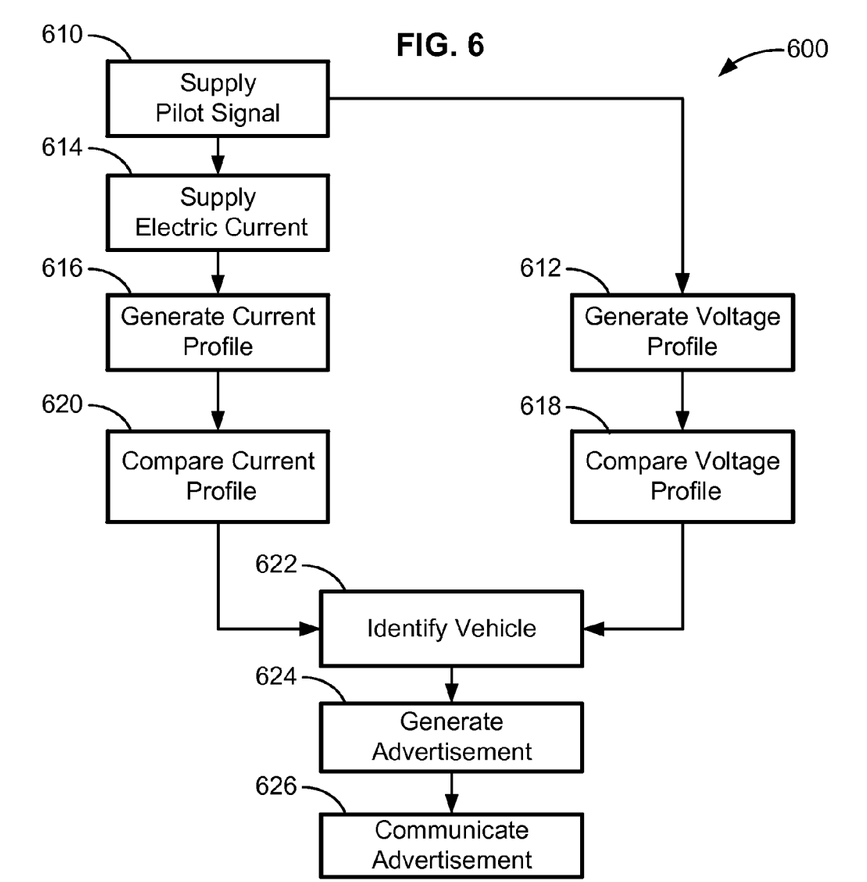
FIG. 6 is a flowchart of a method of identifying an electric vehicle in accordance with an aspect of the disclosure.

Analyses of current profiles as charging begins and voltage profiles of the pilot signals can be used separately or in conjunction with one another to identify an electric vehicle. For example, as shown in FIG. 6, an EVSE can supply a pilot signal to an electric vehicle (610). The EVSE can generate a voltage profile of the pilot signal supplied to the electric vehicle as the EVSE indicates it is ready to charge and the vehicle acknowledges the indication (612). Upon receiving the acknowledgement, the EVSE begins supplying an electric current to the electric vehicle (614). As it begins supplying the current, the EVSE measures the current and generates a current profile of the supplied electric current (616). The EVSE compares the measured voltage profile of the pilot signal to a plurality of stored voltage profiles to determine a closest match voltage profile (618) in the manner described above.

Concurrently, the EVSE compares the current profile of the current supplied to the vehicle to a plurality of stored current profiles to determine a closest match current profile (620) in the manner described above. The EVSE then identifies the particular vehicle make, model, and/or model year associated with the closest match voltage profile and the closest match current profile (622).

If the closest match current profile is associated with a different vehicle than the closest match voltage profile, the EVSE can weigh one profile over another. For example, if the database of current profiles is more robust than the database of voltage profiles, the best match current profile can be weighted more heavily. Similarly, if a the best match current profile was generated as an average of several vehicle tests, while the best match voltage profile was generated from a single vehicle test, the best match current profile may be considered more accurate and weighted more heavily. The EVSE can also determine a correlation between a measured profile and a stored profile to determine a degree of similarity. In such case, if a measured current profile is a closer match (correlates more highly) to a best match stored current profile than a measured voltage profile is to the best match stored voltage profile, the best match current profile can be weighted more heavily. Alternately, if the best match current profile and the best match voltage profile disagree, the EVSE can generate as its result an error signal or other indication that the vehicle could not be identified.

Figure 7:
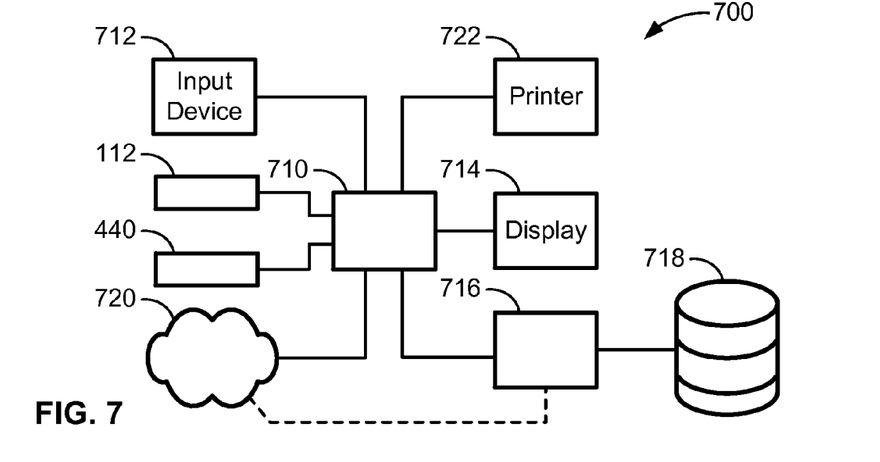
FIG. 7 is a block diagram of an EVSE in accordance with an aspect of the disclosure.

As shown in FIG. 7, an EVSE 700 can include circuitry for evaluating current and voltage profiles. For example, comparators 112 and 440 described above in conjunction with FIGS. 1 and 4, respectively, can be implemented as software modules executed on a CPU 710 (shown in FIG. 7). The CPU 710 can be coupled to an input device 712. The input device 712 may comprise a keypad, computer keyboard, computer mouse, and/or a microphone, although other types and numbers of input devices can be used. The input device 712 can accept information from the vehicle's driver, such as the make, model, and model year of the vehicle at the EVSE, or the identity and contact information of the driver. The CPU 710 can also be coupled to a display 714. The display 714 may comprise a computer display screen, such as a CRT or LCD screen, or set of LEDs, by way of example only, although other types and numbers of displays can be used.

The identification of vehicle characteristics, such as the make, model, and/or model year of the vehicle being charged by the EVSE 700 can be used to generate a targeted advertisement to the driver or owner of the vehicle (FIG. 6, item 624). For example, the EVSE 700 can include an advertisement module 716 coupled to an advertisement database 718 that includes a plurality of advertisements associated with particular vehicle makes and models. The advertisement module 716 can be implemented as a software module executed by the CPU 710 or using a separate processor. The advertisement module 716 could also be separate from and located remotely from the EVSE 700, for example over a network such as the Internet 720. The advertisement database 718 similarly can be implemented in memory resident in the CPU 710 or a separate memory, and can be implemented in the same memory storing voltage or current profiles. The CPU 710 sends a message to the advertisement module 716 identifying the make and model of the electric vehicle being charged. The advertisement module 716 compares the vehicle characteristics to the advertisements in the advertisement database 718 and selects an appropriate advertisement. For example, if the EVSE 700 identifies the electric vehicle being charged as a Chevrolet Volt®, the advertisement module 716 might select an advertisement from the service department of a local Chevrolet dealership. The selected advertisement is then communicated to the driver (FIG. 6, item 626). For example, the advertisement can be displayed by the CPU 710 on the display 714.

The advertisement module 716 can also use information supplied by the vehicle driver at the input device 712 to further refine the selection of an advertisement. For example, the driver's zip code could be used to select an advertisement from an appropriate dealership local to the driver. In the case of the EVSE being located at a supermarket or drug store, the advertisement module 716 could use demographic information supplied by the driver in combination with the vehicle identification to select an appropriate coupon to present to the driver through a printer 722 coupled to the CPU. In another alternative, the advertisement module 716 can select an advertisement for transmitting to the vehicle driver or owner through an electronic message. Examples of electronic messages include electronic mail (email), text messages, SMS messages, and instant messages.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. An electric vehicle supply equipment comprising:
a power supply configured to supply electric power to an electric vehicle;
a pilot signal generator configured to generate a pilot signal;
an electric vehicle interface coupled to the pilot signal configured to supply the pilot signal to an electric vehicle;
a voltage measurement module coupled to the electric vehicle interface configured to measure the voltage of the pilot signal; and
a comparator coupled to the voltage measurement module configured to:
generate a voltage profile of the measured voltage over a period of time;
compare the voltage profile to a database of stored voltage profiles to identify a closest matching voltage profile; and
identify a vehicle associated with the closest matching voltage profile.

2. The electric vehicle supply equipment of claim 1, wherein identifying the vehicle comprises identifying a vehicle make, a vehicle model, and/or a vehicle year.

3. The electric vehicle supply equipment of claim 1,
wherein the pilot signal generator comprises:
a constant pilot signal generator; and
an oscillating pilot signal generator;
wherein the pilot signal generator is configured to
generate a constant pilot signal until the electric vehicle charging station is ready to supply electric power to the electric vehicle; and
generate an oscillating pilot signal of a first voltage range upon the electric vehicle charging station becoming ready to supply electric power to the electric vehicle;
wherein the voltage measurement module detects a voltage drop in the oscillating pilot signal when the electric vehicle acknowledges the oscillating pilot signal; and wherein the generated profile comprises a measured time between the electric vehicle charging station becoming ready to supply electric power to the electric vehicle and the electric vehicle acknowledging the oscillating pilot signal.

4. The electric vehicle supply equipment of claim 1, further comprising:
a current measurement module configured to measure a current corresponding to the electric power supplied to the electric vehicle;
wherein the comparator is coupled to the current measurement module and is configured to:
generate a current profile of the measured current over a period of time;
compare the current profile to a database of stored current profiles to identify a closest matching current profile; and
identify the vehicle characteristic associated with the closest matching voltage profile and the closest matching current profile.

5. The electric vehicle supply equipment of claim 1, wherein the stored voltage profiles comprise previously recorded measurements of voltage profiles taken from representative electric vehicles.

6. The electric vehicle supply equipment of claim 1, further comprising:
an advertisement module coupled to the comparator configured to generate an advertisement corresponding to the identified vehicle characteristic; and
a display device for displaying the advertisement.

7. The electric vehicle supply equipment of claim 6, wherein the advertisement module is coupled to the comparator through a network.

8. A method of identifying an electric vehicle characteristic, the method comprising:
supplying a pilot signal to an electric vehicle;
generating a voltage profile of the pilot signal supplied to the electric vehicle over a first period of time;
supplying an electric current to the electric vehicle to charge a battery of the electric vehicle;
generating a current profile of the supplied electric current over a second period of time;
comparing the voltage profile to a plurality of stored voltage profiles to determine a closest match voltage profile;
comparing the current profile to a plurality of stored current profiles to determine a closest match current profile; and
identifying an electric vehicle associated with the closest match voltage profile, the closest match current profile, or both.

9. The method of claim 8,
wherein identifying the vehicle comprises identifying a vehicle make, a vehicle model, and/or a vehicle year;
wherein the stored current profiles comprise previously recorded measurements of current profiles taken from representative electric vehicles; and
wherein the stored voltage profiles comprise previously recorded measurements of voltage profiles taken from representative electric vehicles.

10. The method of claim 8, wherein the identifying the electric vehicle further comprises:
determining a first correlation between the generated voltage profile and the closest match voltage profile;
determining a second correlation between the generated current profile and the closest match current profile; and
identifying the vehicle based on the first correlation, the second correlation, or both.

11. The method of claim 8, further comprising:
generating an advertisement based on the identified vehicle; and
communicating the advertisement to a driver of the electric vehicle.

12. The method of claim 11, wherein the communicating the advertisement to the driver comprises transmitting the advertisement by an electronic message.

13. The method of claim 11, wherein the communicating the advertisement to the driver comprises displaying the advertisement on a display.

14. The method of claim 8, wherein the generating a current profile of the supplied electric current over a second period of time generates the current profile from an evaluation of the supplied electric current, and not from any data about the electric vehicle transmitted from the electric vehicle.

15. The method of claim 8, wherein the identifying an electric vehicle does not employ any data about the electric vehicle, which is transmitted from the electric vehicle, to identify the electric vehicle.

16. The method of claim 8, wherein the generated current profile comprises a current ramp of the supplied current over the second period of time.

* * * * *